United States Patent [19]

Dix et al.

[11] Patent Number: 5,017,332
[45] Date of Patent: May 21, 1991

[54] TWO-PHASE PRESSURE DROP REDUCTION BWR ASSEMBLY DESIGN

[75] Inventors: Gary E. Dix; Russell L. Crowther, both of Saratoga; Mark J. Colby, San Jose; Bruce Matzner, San Jose; Robert B. Elkins, San Jose, all of Calif.

[73] Assignee: General Electric Company, San Jose, Calif.

[21] Appl. No.: 375,646

[22] Filed: Jul. 3, 1989

Related U.S. Application Data

[63] Continuation-in-part of Ser. No. 176,975, Apr. 4, 1988.

[51] Int. Cl.$^5$ .......................................... G21C 15/00
[52] U.S. Cl. ..................................... 376/370; 376/377; 376/428; 376/435; 376/444
[58] Field of Search .............. 376/370, 444, 377, 428, 376/435

[56] References Cited

U.S. PATENT DOCUMENTS

| | | | |
|---|---|---|---|
| 2,998,367 | 8/1961 | Untermyer | 204/193.2 |
| 4,587,093 | 5/1986 | Borrman et al. | 376/444 |
| 4,629,599 | 12/1986 | Crowther et al. | 376/212 |
| 4,675,154 | 6/1987 | Nelson et al. | 376/444 |
| 4,826,653 | 5/1989 | Nylund et al. | 376/444 |
| 4,826,654 | 5/1989 | Aoyama et al. | 376/444 |
| 4,863,680 | 9/1989 | Sakurada et al. | 376/444 |

Primary Examiner—Brooks H. Hunt
Assistant Examiner—N. Bhat
Attorney, Agent, or Firm—Robert R. Schroeder

[57] ABSTRACT

In a boiling water reactor having discrete bundles of fuel rods confined within channel enclosed fuel assemblies, an improved fuel design of bundles of fuel rods interior of the channels is disclosed. Specifically, partial length rods are utilized which extend from the bottom of the channel only part way to the top of the channel. These partial length rods are shortened with respect to the remaining rods and are symmetrically distributed throughout the fuel bundle with the preferred disposition being in the second row of the bundle of fuel rods from the channel wall. The symmetrical distribution of the partial length rods is at spaced apart locations one from another. The partial length rods extend from the bottom of the fuel bundle and terminate within the boiling region. during shutdown of the reactor, an improved cold shutdown margin is produced at the top of the fuel assembly due to the improved moderator-to-fuel ratio and reduction in plutonium formation at the upper portion of the bundle. Shutdown control rod worth is improved due to greater moderator-to-fuel ratio and a longer thermal neutron diffusion length. During power reator operation, the partial length fuel rods improve flow distribution above the ends of the partial length rods by channeling steam in the open interstitial area between rods above the ends of the partial length rods. This enables a high slip ratio of steam with respect to water and increases the density of the moderating water about the remaining rods in the upper region of the bundle at power operation. The total pressure drop is reduced, permitting more fuel rods in the design or a larger fuel rod diameter. The ratio of two-phase pressure drop to single phase pressure drop also is reduced, tending to increase the threshold for thermal hydraulic instability or coupled nucler-thermal-hydraulic instability. Rod spacers and bundle tie plates are provided with larger apertures overlying the partial length rods for further channeling of the steam and reduction of two-phase pressure drop. Most importantly and during full reactor power output, the pressure drop in the two-phase region of the bundle is reduced without substantial corresponding degradation of the fuel assemblies thermal limits. These features permit designs with larger fuel rod diameter than are possible without part length rods and results in a net increase in fuel assembly uranium weight with the larger fuel rod diameter more than compensating for the weight removed by shortening some of the fuel rods.

2 Claims, 8 Drawing Sheets

TWO-PHASE PRESSURE DROP REDUCTION BWR ASSEMBLY DESIGN

This application is a continuation-in-part of Applicant's co-pending application Ser. No. 176,975, filed Apr. 4, 1988.

BACKGROUND OF THE INVENTION

This invention relates to fuel bundles for placement in channel contained fuel bundles for use in boiling water reactors. More importantly, an improved fuel bundle is disclosed which utilizes partial length rods extending from the bottom of the assembly to the regions of the fuel assembly in which two phase steam-water flow occurs. These partial length rods can be symmetrically or asymmetrically distributed in the interior of the assembly, with the preferable location relative to the channel side walls of a bundle of rods or fuel assembly, contained within a fuel channel of a boiling water reactor, depending on whether nuclear or thermal hydraulic performance was being optimized.

SUMMARY OF THE PRIOR ART

Modern boiling water reactors include in the core region of the reactor a core bypass volume and a fuel channel volume.

The fuel channel volume includes bundles of elongated rods or cladding containing the reacting fuel. These bundles are placed within channels between a support plate on the bottom and a tie plate at the top. In many modern fuel bundle designs, one or more hollow tubes or "water rods" are positioned in the bundle to provide an additional volume of moderating water.

The core bypass volume is exterior of the channels. It is the region in which the control rods control the nuclear reaction and includes additional water moderator for efficient reaction.

Modern fuel bundle design has been limited by the need to operate below thermal limits and avoid thermal hydraulic instabilities and coupled nuclear-thermal-hydraulic reactor core instabilities. The stability limits affect the degree to which the fuel assembly can be optimized for minimum fuel cycle costs. Modern boiling water reactor fuel bundle design also is limited by the need to be able to shut the reactor down in the cold state with any control rod stuck in the fully withdrawn position. Since one of the purposes of this invention is to optimize the fuel bundle design for fuel cycle economics while maintaining good margin to thermal, stability and cold shutdown limits, a discussion of the thermal, stability and cold shutdown limits is required.

Cold Shutdown Limits

Modern fuel bundles tend to be most reactive when the reactor is cold or shut down. In this operating state, the inserted control rods must absorb the maximum quantity of slowed neutrons in order to keep the reactor from going critical. The necessary degree of safety required to keep such reactors from criticality is referred to as the cold shutdown margin.

In a boiling water reactor the conversion ratio is greater in the top of the reactor due to the effects of steam voids on plutonium production. This causes plutonium to build up at a higher rate at the top of the reactor. Uranium 235 also is depleted less and the fuel burnup is smaller at the top of the reactor. This buildup of plutonium, reduction in burnup and smaller U-235 depletion at the top of the the fuel rods within the fuel assemblies decreases the cold shut down margin locally at the top of the reactor. As the prior art fuel assemblies having uniform rod distribution from top to bottom matures with burning in a reactor, it is common for the cold reactivity to be greatest at the top of the bundle in the cold operating state. Therefore, in the cold state it is the upper portion of the reactor fuel bundles that go critical first. The control system must be designed to prevent the reactor from going critical at these upper fuel rod portions.

The prior art has corrected for the cold shutdown margin with the addition of burnable absorbers, typically gadolinium, or reduced enrichment to the fuel assembly as described in Crowther et al. U.S. Pat. No. 4,629,599. Unfortunately, gadolinium, is a burnable absorber that leaves a residual after depleting which reduces the worth of the fuel load. Location of gadolinium or reduced fuel enrichment preferably in the top of the fuel assembly causes local reduction of power at the top of the reactor and increases the ratio of peak-to-average power in the reactor, which also must be kept within limits. If burnable absorber content of the fuel and local reduction in fuel enrichment can be reduced and the cold shutdown margin nevertheless maintained, this will reduce fuel enrichment requirement and improve fuel costs and will reduce the peak-to-average power in the reactor.

Thermal-hydraulic Instabilities

Forced circulation boiling nuclear reactors are operated during start-up and other conditions with natural circulation of the reactor coolant. However, the power that can be attained with natural circulation flow is limited by instabilities that occur when the power is increased to too great a level. As the reactor comes on-line and heats up, the cooling fluid within the reactor begins to boil. That is to say, the moderating water is present with increasing amounts of generated steam. This steam, when present in large (void) fractions, can lead to thermal hydraulic instability and coupled nuclear thermal hydraulic instabilities.

Natural circulation boiling water reactors are limited in power output by stability limitations. Stability limits require that the core for a required power rating be of a minimum size and this influences the required reactor vessel size and containment size. Limits of reactor vessel size limit the power that can be produced by a natural circulation boiling water reactor.

The following discussion will relate to these instabilities for identification purposes only, and so that the improvements of this invention can be understood.

The presence or more accurately the possibility of the presence of these instabilities constitute limitations on fuel bundle design. Therefore, if a design can be generated that is less sensitive to these instabilities, improved worth and performance of the reactor fuel can be realized through a more optimum choice of fuel assembly design parameters. The practicality and economics of designing boiling nuclear reactors with no pumps and only natural circulation of the coolant also is improved.

When the reactor is on-line and running, the reactor can be controlled in power output by the amount of coolant or water pumped through the reactor. Control occurs from a natural equilibrium resulting from the resident void fraction of steam relative to water within the reactor. Simply stated, for a constant flow rate of moderating water as power increases, steam void fraction also increases. This limits the moderator present and in the absence of instabilities controls power output.

As the ratio of power to the flow rate is increased instabilities can be encountered. Specifically, either thermal hydraulic channel instabilities or coupled nuclear thermal hydraulic instabilities can be encountered. The instabilities are most likely to occur when the reactor is at natural circulation conditions and the ratio of percent of rated power to percent of rated flow is greater than approximately 1.7.

Thermal hydraulic channel instability is caused by the potential for several flow rates to occur at a constant core pressure drop. This is caused by the strong flow dependence of the two phase pressure drop on the pressure drop in the high steam void region at the top of the fuel bundles. If the single phase pressure drop of the bottom of the bundle is increased or the ratio of the two phase pressure drop to the single phase pressure drop is reduced, the threshold for channel thermal-hydraulic instability is increased.

Further, coupled nuclear-thermal-hydraulic instabilities also are known. In these instabilities, feedback from steam voids to reactor power can reinforce through the delay time in the recirculation loop and through the dependence of core pressure drop and core flow on reactor power to cause an instability. Larger steam void fractions and larger effects of steam on reactivity decrease margin to the threshold for this type of instability.

Coupled nuclear-thermal-hydraulic instability may create either local channel instabilities or instabilities which occupy substantial portions or all of the core. The instabilities usually reach a limit cycle but since reactor cooling can be affected and the reactor operation becomes very noisy, they are avoided in reactor operations.

Both thermal hydraulic instability and coupled nuclear-thermal-hydraulic instability are sensitive to the ratio of single phase pressure drop to two-phase pressure drop in the fuel bundle. This ratio can be easily understood. As coolant is forced upwardly through a fuel bundle, there is a pressure drop. A portion of this pressure drop occurs at the bottom nonboiling portion of the reactor. This portion of the pressure drop is the single phase pressure drop. The remaining portion of the pressure drop occurs in the upper boiling portion of the fuel bundle. This portion of the pressure drop in the fuel bundle is a two-phase pressure drop portion.

By reducing the pressure drop in the two-phase region relative to the single-phase region, the tendencies for thermal hydraulic instability and coupled nuclear thermal hydraulic instabilities can be reduced.

One of the variables in reactor design is to increase the number of rods in the fuel assembly to increase heat transfer area. Unfortunately as the number of rods goes up, the pressure drop—both single phase and two-phase—also goes up. When rod density in the fuel assembly is increased, the power/flow ratio threshold for instability is reduced.

Thermal Power Limitations

Fuel bundles have a power limitation known as a thermal limit. The thermal limit defines the maximum power that a fuel bundle can output before boiling transition occurs in the fuel assembly. Boiling transition occurs when the liquid film flowing on the surface of a fuel rod dries out. This causes temperature fluctuation on the surface of the fuel rods and can cause a rapid increase in fuel rod surface temperature for a small increase in power production. Once any part of a particular bundle has exceeded this thermal limit, the power output of remainder of the rods within the reactor bundle are limited by that event.

The upper portion of the fuel assembly, where the steam void content is greatest, is where film dryout or boiling transition is most likely to occur. The propensity for boiling transition is a function of the detailed flow structure and distribution in the top of the fuel assembly. It is desirable to maintain the liquid film flowing up the surface of the fuel rods and have the steam flow at a higher velocity in the central region between fuel rods. There is a tendency, due to forces on steam bubbles in the local fluid velocity distribution between fuel rods, for the steam to migrate to the central regions between fuel rods where it flows at a higher velocity than the liquid flowing on the fuel rods surface. However, if fuel assembly power is increased sufficiently, the combination of greater steam formation on the fuel rod surface and less available liquid film from high steam volume fractions cause additional dryout patches to form on the fuel rod surface. As these patches are formed and re-covered with liquid, temperature oscillations occur on the fuel element surface. The bundle power at which boiling transition first occurs is called the critical power. Limits are applied in reactor design and reactor operation to avoid exceeding the critical power for all fuel assemblies in the reactor.

Flow Induced Vibration Limits

In boiling water reactors fluid forces originate from the flow of the coolant past the fuel rods and from the boiling process. Fuel assembly designs must withstand these forces and prevent vibration of the fuel rods which would cause them to wear and fail, which would cause leakage of nuclear fission products from the interior of the rod. Fuel rod spacers and upper and lower tie plates are introduced in reactor design to support the fuel rod and thus to protect against flow induced vibration.

Prior Patent Art

Axial distribution of the moderator to fuel ratio in a reactor not having fuel channels is known from prior art. Specifically, in Untermyer U.S. Pat. No. 2,998,367 issued Aug. 29, 1961 a design is disclosed for the purpose of maintaining a reactor in a greater power generation state when resident steam voids coupled with flow control the reactor.

U.S. Pat. No. 2,998,367 describes a boiling water reactor which has a positive steam void coefficient of reactivity in the regions of the reactor where boiling occurs and which has a moderator-to-fuel atom ratio that increases along the coolant path in the direction of the flow. In one embodiment said invention incorporates the axial variation in moderator-to-fuel atom ratio by having nuclear fuel elements of different lengths disposed parallel to one another.

Relative to prior art, the within invention addresses the different case of a boiling water reactor with a negative steam void coefficient of reactivity, with channels surrounding each fuel assembly and with spacers to separate fuel rods within fuel assemblies. For this different reactor design, the preferred embodiment of the within invention incorporates a synergistic combination of features to improve reactor performance, reliability and economics including optimum location of the partial length rods within the fuel assembly; optimal axial shape and uranium enrichment in the partial length rods; unique design of fuel rod spacers and upper tie plate to enhance performance of the part length rods; optimum length of the part length rods relative to spacer placement so as to avoid flow induced vibrations; optimum location of the fission gas plenum within the part length rods to avoid neutron absorption reactivity penalties; and optimum location of the part length rods relative to the control rods to improve control rod worth while also avoiding power peaking problems with the control rod withdrawn.

SUMMARY OF THE INVENTION

In a boiling water reactor having discrete bundles of fuel rods confined within channel enclosed fuel assemblies, an improved fuel design of bundles of fuel rods interior of the channels is disclosed. Specifically, partial length rods are utilized which extend from the bottom of the channel with the boiling region only part way to the top of the channel. These partial length rods are shortened with respect to the remaining rods and are distributed throughout the fuel bundle with the preferred disposition being in the interior of the bundle of fuel rods from the channel. In the preferred embodiment the partial length rods are located within the fuel assembly and extend from the bottom of the fuel bundle and terminate at a spacer which is located in the two phase flow region of the fuel assembly. Not all partial-length rods need be of the same length. For example, some may terminate at one spacer, while others terminate at another spacer. Preferably, the length of partial-length rods is at least one-third of the total height of the fuel bundle. During power operation a steam water mixture is present in the open area above the part length rods. However, when the reactor is shutdown in the cold state this open area is filled with water. Consequently, the part length rods have a larger effect on moderator-to-fuel volume ratio in the cold state than in the hot state which favorably aids in nuclear design of the fuel. During start-up of the reactor, an improved cold shutdown margin is produced at the top of the fuel assembly due to the increased moderator-to-fuel ratio at the top of the fuel assembly. Shutdown control rod worth is improved due to some of the moderator above the part length rods being near the control rods where the increased moderation increases the number of neutrons that are transported or diffuse to the control rod surface. During power reactor operation, the partial length fuel rods effectively channel steam flow to the expanded interstitial area between rods overlying the ends of the partial length rods. This enables a high slip ratio of steam with respect to water and increases the density of the moderating water about the remaining rods in the upper region of the bundle at power operation. Rod spacers and bundle tie plates are provided with larger apertures overlying the partial length rods for further flow distribution improvement and reduction of two-phase pressure drop. Most importantly and during full reactor power output, the total pressure drop and the pressure drop in the two-phase region of the bundle are both reduced without substantial corresponding degradation of the fuel assemblies thermal limits. The ratio of single phase pressure drop to two-phase pressure drop is increased tending to increase power and flow margin for thermal hydraulic instability or coupled nuclear-thermal-hydraulic instability.

The part length rods may be located in the second row from the outside of the fuel assembly. In this location the steam channeling above the part length rods tends to improve the fuel assembly power that can be generated before the onset of boiling transition.

In a preferred embodiment, eight partial-length rods are provided in a 9×9 array. They are positioned in such a way, with respect to the full-length rods and the water rods, that each full-length rod is adjacent to either a partial-length rod or a water rod.

The part length rods preferably have a short natural uranium section at the upper end to mitigate power peaking at the top of the part length rods. The part length rods preferably have a bottom fission gas plenum to minimize or eliminate fission gas plenum retainer spring and hydrogen getter device neutron absorption at the top.

Other Objects, Features and Advantages

An object of this invention is to disclose a fuel design for placement within a channel contained fuel assembly that has an improved cold shutdown margin. According to this aspect of the invention, the fuel bundle within a channel has partial length rods extending into and terminating within the two phase region of the fuel bundle, extending into the boiling region and in the preferred embodiment typically occupying at least the bottom third of the bundle. The upper region of the fuel bundle above the partial length rods includes open volumes that would otherwise be occupied by full length fuel rods. Hence, in the upper portion of the fuel bundle in the cold state, the moderator-to-fuel ratio is increased. Consequently, with the addition of moderator, the cold shutdown margin is improved.

A further advantage of the resulting improved cold shut down margin enables fuel loads to be designed with reduced amounts of burnable absorbers such as gadolinium. By reducing gadolinium, burnable absorbers, better fuel cycle economics can be realized. The within invention enhances and improves U.S. Pat. No. 4,629,599 by increasing the moderator-to-fuel volume ratio in the region of the core where the cold shutdown margin tends to be poorest and by increasing the ratio of moderator-to-fuel ratio in the cold state to moderator-to-fuel ratio in the hot state, locally in the top of the reactor.

Yet another advantage of this invention is that the tendency of the reactor to produce plutonium at the top of the bundle from resonance neutron capture in uranium 238 is reduced. Specifically, the increased moderator to fuel ratio reduces the resonance neutron flux, the U-238 neutron absorption, and the resultant plutonium production. This further improves cold shutdown margin, reduces initial enriched uranium requirements and makes the negative steam void coefficient of reactivity smaller. Reduced uranium 235 initial inventory improves fuel cycle economics and the smaller steam void coefficient of reactivity improves pressure transient response and increases coupled nuclear-thermal-hydraulic stability.

An additional result of the disclosed fuel design is that the control rod worth relative to the upper end of the bundle is improved. Specifically, the control rods acting at or near the top of the fuel bundle see a higher density of slow neutrons. This is because the ambient fast neutrons are increasingly moderated by the increased volume of water in the region above the part length rods in the second row of fuel rods adjacent to the control blade. This increases the number of thermal neutrons that diffuse or are transported to the control blade surface where they are absorbed.

A further object of this invention is to disclose a fuel bundle design having maximum stability at low flow conditions. According to this aspect of the invention, partial length rods increase the flow area in the two phase flow region of the fuel assembly.

An advantage of this aspect of the invention is that the spatial volume above the partial length rods is available for steam escape from the channel. Accordingly, these volumes draw the relatively fast moving high volumes of steam away from the heated rods of the fuel bundle. The steam tends to concentrate and channel at a higher velocity in the open areas above the partial length rods during power operation of the reactor.

A further advantage of steam channeling above the partial length rods is that the rods which are adjacent to and extend above the partial length rods are cooled and moderated by increased liquid fraction. The increased liquid fraction about the remaining rods is believed to be present due to the steam transport to the open areas above the partial length rods which results in the steam flowing at a high velocity relative to the water velocity. Accordingly, these rods immersed in moderator have improved thermal margins and reactivity and contribute additional power. Preferred location of the partial length rods adjacent to the highest power rods in the fuel assembly and one row in from surrounding channel walls increases the benefit from this effect. Similarly, positioning part length rods and water rods, such that all full length rods are adjacent to either a part length rod or a water rod, increases the benefit of this effect.

Yet another advantage of this invention is that the partial length rods are located so as to shorten those full length rods that would otherwise be limiting the power output of the fuel bundle. Since boiling transition limits occurs in the top of the fuel assembly, this increases allowable maximum bundle power.

Another advantage of this invention is that while the ratio of single phase pressure drop to two phase pressure drop is reduced, the thermal margins of a fuel bundle are preserved.

Yet another object of this invention is to disclose the construction of the partial length rods. According to this aspect of the invention, the partial length rods are provided with uranium of reduced enrichment adjacent the tip. Such a zone at the tip of the part length rod prevents power peaking at the top of the part length rod.

A further object of this invention is to disclose the construction of a fuel assembly with part length rods whereby each of the part length rods is terminated at a fuel rod spacer. This aspect of the invention prevents flow induced vibration problems due to the part length rods not extending into and being supported by the upper tie plate.

A further aspect of this invention is to disclose the construction of tie plates and spacers for enhancing the benefits of the partial length rods. According to this aspect of the invention, both the tie plate and the spacers above the partial length rods are provided with expanded flow area apertures. The apertures are made feasible by eliminating need for some of the spacers and the upper tie plate to support fuel rods at the locations of the partial length rods. These apertures further reduce pressure drop and aid in maintaining channeling of steam above the tops of the partial length rods. These apertures allow further reduction in the two-phase pressure drop.

An additional advantage of these apertures is that they increase the velocity of the steam relative to the water or the slip ratio within the fuel assemblies during power generation. Increase of the slip ratio reduces the steam void content in the top of the reactor which increases reactivity, improves fuel cycle economics and improves axial power distribution.

BRIEF DESCRIPTION OF THE DRAWINGS

Other objects, features, and advantages of this invention will become more apparent after referring to the following specification and attached drawings in which.

Figure 1:
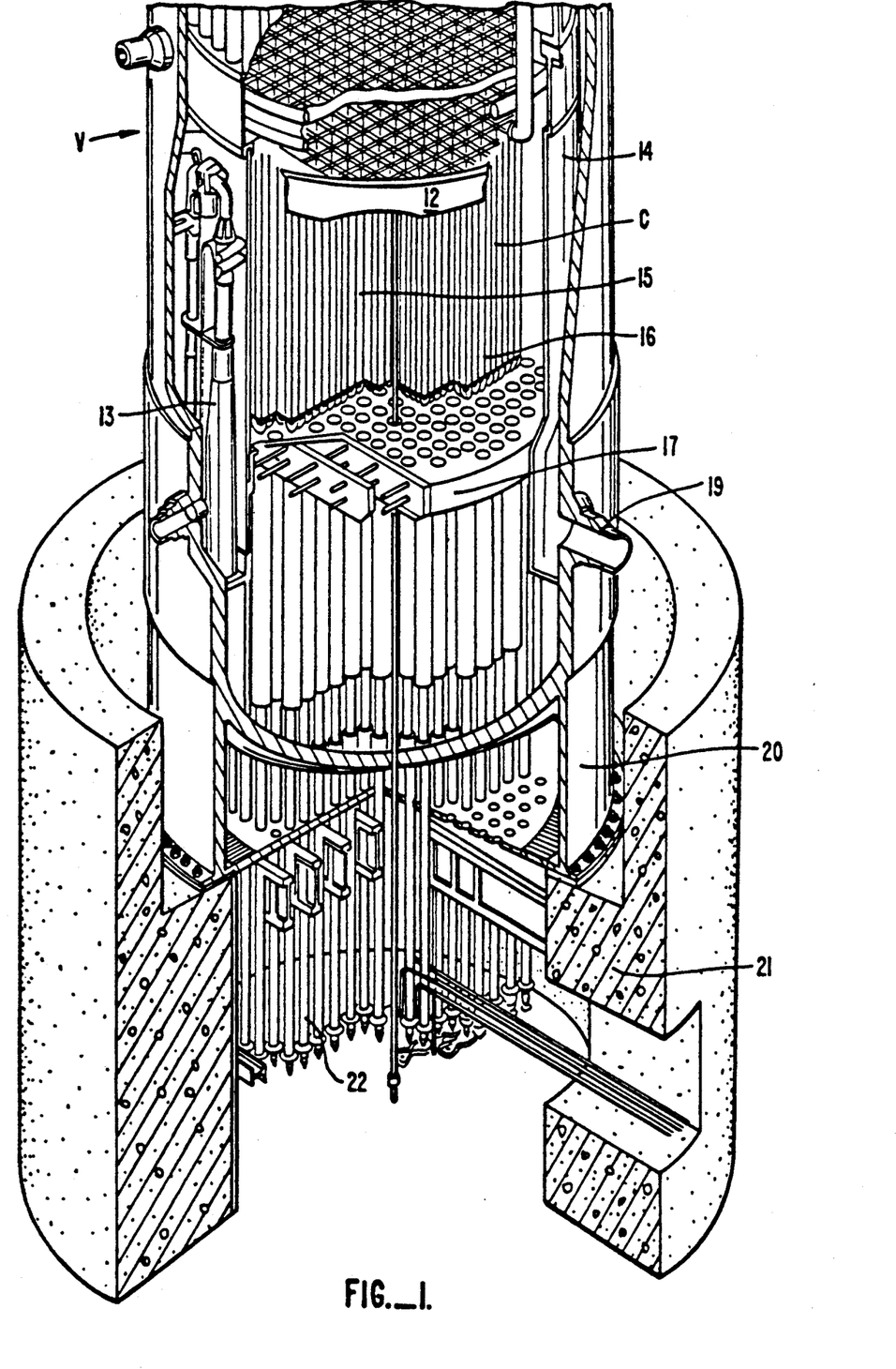
FIG. 1 is a perspective of a reactor.

Referring to FIG. 1 a partial view of a reactor is illustrated so that the invention may be fully understood. A shield wall 21 is shown supporting a support skirt 20 and a reactor vessel V. The vessel has inside a core plate 17 and an overlying top guide 12. Fuel assemblies 15 are placed within the core C of the reactor on core plate 17 and are held in vertical spaced apart relationship at top guide 12. These fuel assemblies are controlled in their output by control blades 16.

Water circulation is provided to the reactor from a recirculation outlet 19 to a recirculation inlet 18 by pumps (not shown). Interior of the reactor, circulation is provided by a jet pump assembly 13 which causes outward downflow of water and forces the water flow upwardly and inwardly through the core C. When the flow passes upwardly through the core C, it passes through the fuel assemblies 15, up through the top guide 12, through a steam separator and steam dryer assembly 30 and then to power extracting turbines.

Figure 2:
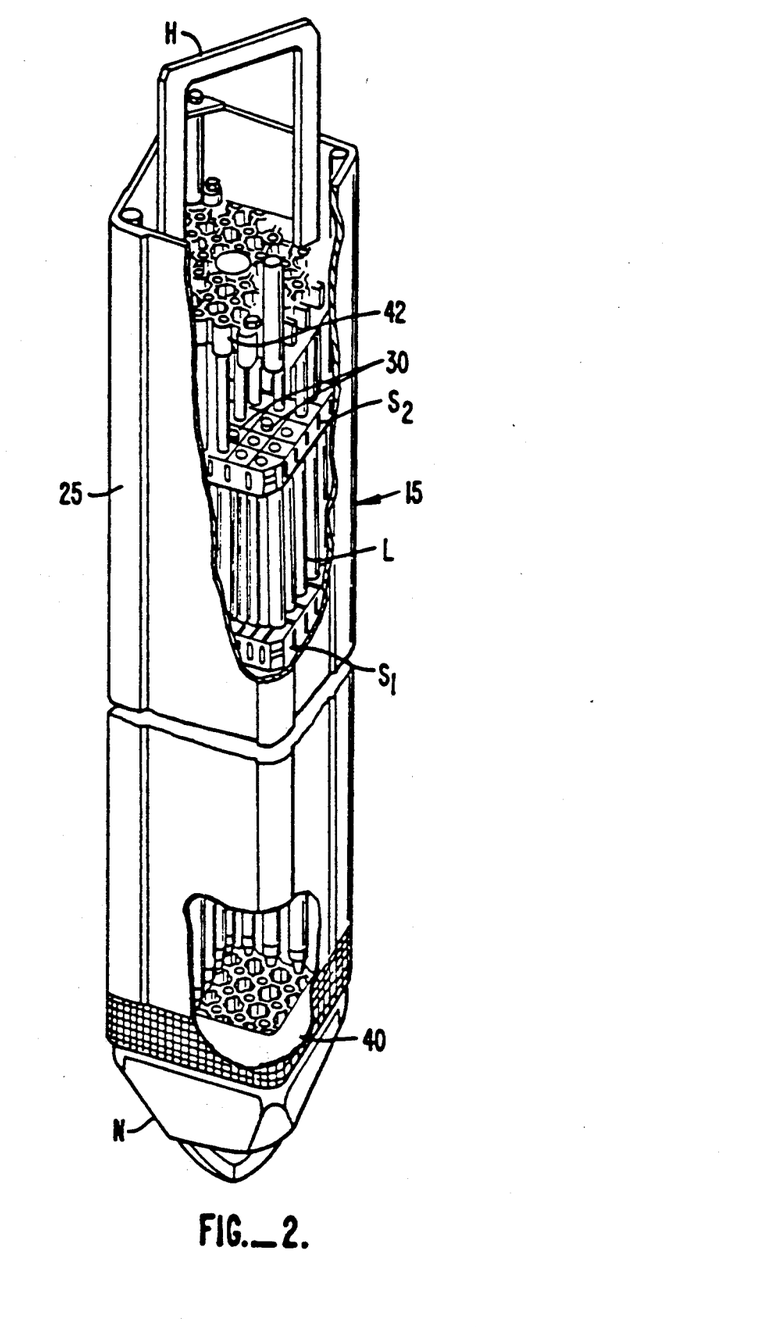
FIG. 2 is a perspective of a fuel bundle from the reactor incorporating the partial length rods of this invention.

This invention relates to an improved fuel assembly, one of which is shown in FIG. 2 at 15.

Referring to FIG. 2, it will be understood that the fuel assembly is not shown in its true length, and instead is broken away so as to illustrate the bottom and top portions of the bundle only.

The assembly includes an upper handle H and a lower nose piece N. A channel 25 extends upwardly from the nose piece end substantially the full length of the fuel assembly 15.

Individual rods L are disposed in a matrix interior of the fuel assembly. These rods extend between a lower tie plate 40 and an upper tie plate 42.

The rods are normally arrayed in rows and columns. Further, and because of the length of the fuel assemblies (in the order of 160 inches), spacers, e.g., $S_1$, $S_2$ are placed along the length of the fuel assembly. Typically, seven spacers roughly evenly spaced at 20 inch intervals extend from the top to the bottom of the fuel assembly.

Figure 3:
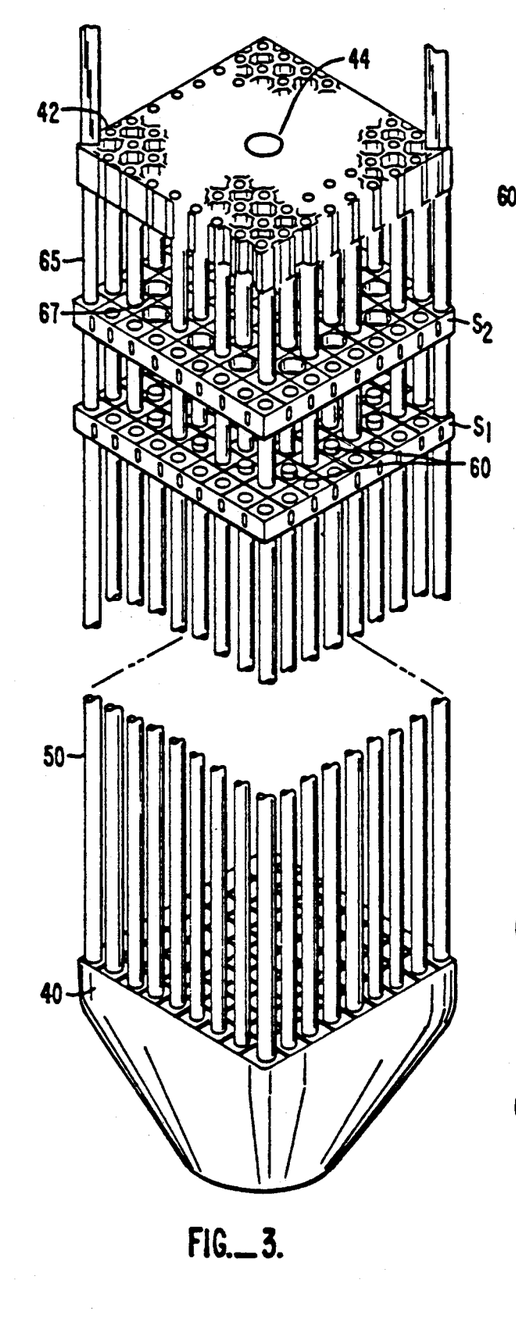
FIG. 3 is a perspective view of a single fuel bundle with the channel removed with the fuel bundle constructed in accordance with this invention illustrating a 9×9 fuel channel array with partial length rods occupying the second row in the lower portion of the fuel bundle and defining overlying volumes in the upper portion of the channel enclosed fuel bundle.

As has been extensively discussed, this invention relates to a new fuel design for placement interior of the channels 25. Referring to FIG. 3, a 9×9 fuel bundle is illustrated. Specifically, fuel rods are placed in a matrix which is 9×9. Were it not for the presence of the central water rod 44, 81 individual rods would extend the length of the matrix of fuel rods shown in FIG. 3.

Some remarks will assist in the understanding of FIG. 3. First, the lower tie plate 40 and the upper tie plate 42 are illustrated. However, the rods are cut away in a substantial portion of their overall length at 50. Secondly, the invention here constitutes modifying preferably the upper two thirds of the fuel assembly. Specifically, the modification is to shorten certain of the fuel rods. These shortened fuel rods will hereinafter be referred to as partial length rods 60. Full length rods 65 will thus be seen to extend the full length of the channel. Partial length rods 60 will thus be seen to extend at least one-third of the length of the fuel assembly. This one-third length starts at bottom tie plate 40 and extends upwardly to and towards upper tie plate 42. However, the partial length rods 60 never reach the full distance. Instead, these partial length rods terminate.

Figure 5A:
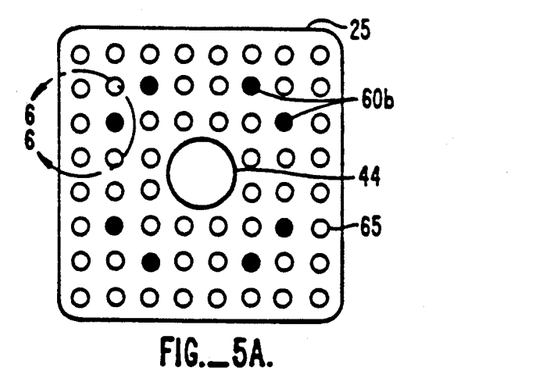
FIG. 5A is a plan section similar to FIG. 2 illustrating in detail the placement of the partial length rods in an 8×8 array.
Figure 13:
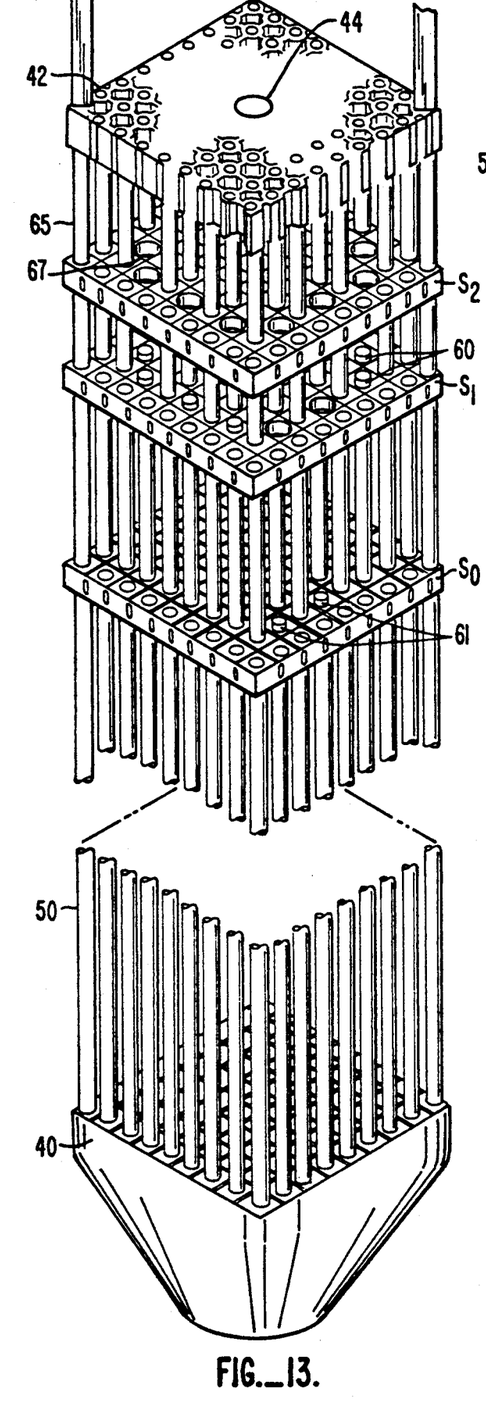
FIG. 13 is a perspective view similar to that of FIG. 3, but showing two different lengths of partial length rods.

It is preferred that the partial length rods be at least within the second row removed from the channel walls 25 (FIG. 5A). In order to illustrate the location of these partial length rods in the perspective of FIGS. 3 and 13, the first row of rods has been omitted from that portion of the perspective that is towards the viewer. What the viewer sees is the second row of rods. It will be understood that the partial length rods referred to herein are in all cases at least in the second row inwardly of the first row of rods, that inward row count starting at the channel wall.

Spacers S2 are illustrated at the upward portion of FIG. 3. These spacers serve to brace the rods 60 and 65 in spaced apart relation as they extend upwardly to and through the length of the fuel assembly. However, in the case of the partial length rods, these rods extend slightly beyond spacer S1. These partial length rods 60 terminate above spacer S1. In an alternative embodiment, depicted in FIG. 13, some of the partial length rods 60 extend to slightly beyond spacer S1, while other partial length rods 61 only extend slightly beyond spacer S0.

Figure 6A:
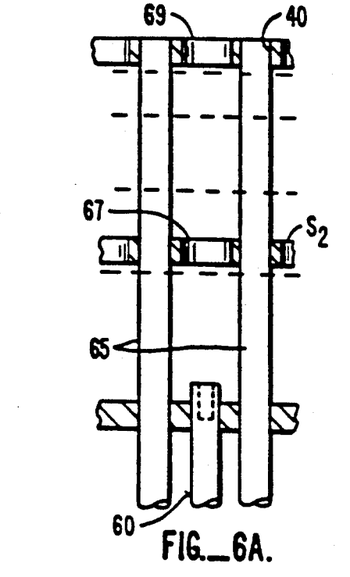
FIG. 6A is a partial enlarged section of the region 6—6 of FIG. 1 illustrating the bundle in a cold state illustrating the increased moderator to fuel ratio.
Figure 6B:
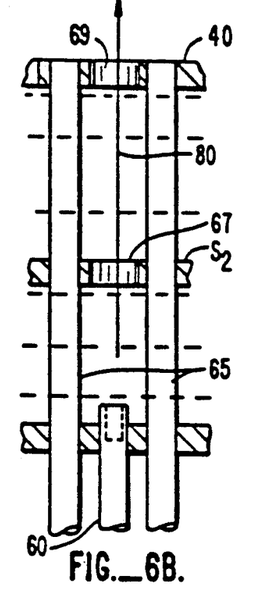
FIG. 6B is a partial enlarged section similar to the region 6—6 of FIG. 1 illustrating this portion of the fuel bundle in a hot operating state and illustrating in phantom what is believed to be a channeling of steam in the volume overlying the partial length rod, this channeling of steam causing a reduction in the two-phase pressure drop and enabling the remaining rods in the upper region of the bundle to realize better cooling during power generating operation, even though heat transfer surface has been removed by shortening some of the fuel rods.

First, and with brief reference to either FIG. 6A or 6B, it can be seen that spacer S2 overlying the partial length rod 60 serves two functions. First, the spacer S2 braces the full length rods 65 apart one from another.

Secondly, spacer S2 defines an aperture 67 of increased area compared to the normal aperture that would be present in a spacer. As will hereinafter be explained and as can be seen in FIG. 6B, this larger aperture 67 enables flow of the coolant to occurs more easily and with lower pressure drop above the partial length rods 60.

Upper tie plate 40 can likewise be modified as is shown in FIGS. 6A and 6B. This upper tie plate includes a larger aperture 69. Aperture 69 reduces pressure drop above the part length rods and thereby, makes it easier for flow to occur above the part length rods.

From the top of the partial length rod 60 downwardly to and towards the lower tie plate 40, the fuel assembly is constructed as is disclosed in the prior art.

Figure 4:
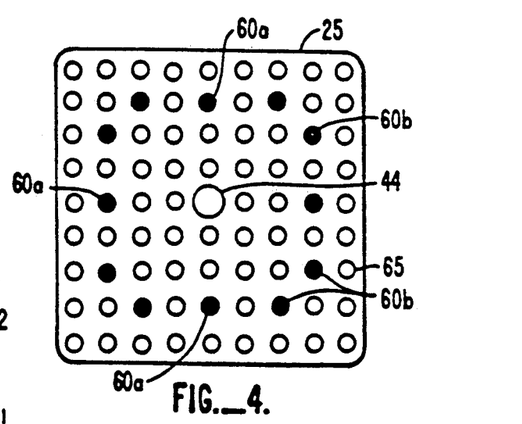
FIG. 4 is a plan section of FIG. 1 taken along lines 2—2 of FIG. 1 illustrating in detail the placement of the partial length rods in a 9×9 array.

In the illustration of FIG. 4, the use of 12 partial length rods has been illustrated. The reader will understand that the total number of partial length rods utilized and their locations in any specific fuel assembly 15 located within core C (FIG. 1), may be varied to meet the necessities of the fuel design and the particular reactor involved.

It has been normal in the past to utilize 8 by 8 arrays of rods (such as those that will be discussed hereafter with respect to FIG. 5). One of the reasons for this utilization of a lesser number of rods is to decrease the pressure drop as coolant proceeds from core plate 17 to and towards guide 12 through the fuel channel 15 (FIG. 1).

As will hereinafter be more fully developed, the partial length rods enable the pressure drop in the two phase portion of the fuel assembly 15 to be reduced. Hence, it is possible to use a more dense array of rods such as the 9×9 array illustrated in FIG. 4. The particular array illustrated in FIG. 4 because of its larger density of individual rods presents better characteristics for production of steam while minimizing the fuel temperature.

Figure 5B:
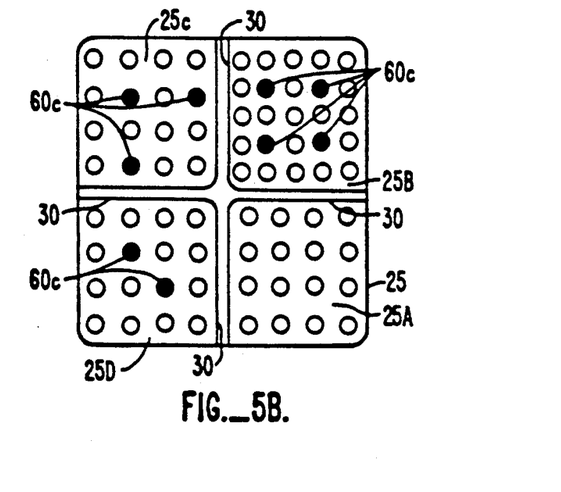
FIG. 5B is a plan section similar to FIG. 5A illustrating the partial length rods in a water cross type fuel bundle design.

It will also be understood, however, that this invention is applicable to other fuel assembly designs such as the 8×8 array of rods illustrated in FIGS. 2 and 5A or the water cross design illustrated in FIG. 5B.

Referring to FIG. 5A, a water rod 44 is surrounded by partial length rods 60b. The partial length rods 60b extend again at least one-third the length of the fuel assembly. In the discussion that follows, the reader will understand that either a 9×9 array is illustrated in FIG. 4 or a 8×8 array is illustrated in FIG. 5A can apply to this invention.

It will be understood that the concepts herein illustrated are applicable to virtually all channel enclosed fuel bundle designs. For example, and as schematically set forth in schematic composite diagram of FIG. 5B, the partial length rods can be utilized in the water cross section therein illustrated.

Referring to FIG. 5B, a water cross section of a fuel channel is illustrated. A channel 25 has its interior divided into four subsections 25A, 25B, 25C, and 25D. Each subsection is defined by a subchannel assembly 30 constituting a metal member bent at right angles and abutting the inside walls of the channel 25.

These subchannel assemblies form two purposes. First, they define between them a cross shaped area for the containment of additional moderator. Secondly, they each enclose discrete volumes of rods.

Figure 12:
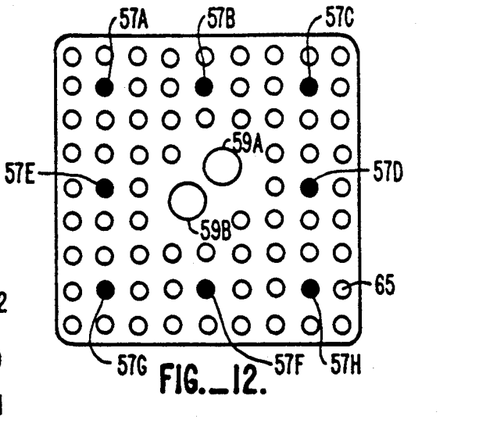
FIG. 12 is a schematic cross-sectional view of a fuel bundle showing a preferred distribution of water rods and partial length rods with respect to full length rods.

Referring to FIG. 12, another embodiment of the invention is illustrated. In this embodiment, eight positions in a 9×9 array are occupied by partial length rods 57A-57H. Seven positions in the 9×9 array are occupied by one or more water rods 59A, 59B. The remaining 66 positions are available for occupation by full length fuel rods 65.

In the embodiment depicted in FIG. 12, each of the full length fuel rods 65 is adjacent to either a partial length fuel rod 57A-57H or a water rod 59A, 59B. By "adjacent to," it is meant that, starting at any full length rod, it is possible to trace a path to a partial length rod or water rod by moving substantially in a direction of a row, a column, or diagonally, without first encountering another full length rod.

Subchannel volume 25A (FIG. 5B) is shown without rods. Subchannel volume 25B is illustrated with two partial length rods 60C. These rods are spaced one row in from the respective channel walls formed by channel 25 and subchannel assembly 30.

Subchannel volume 25C illustrates that in this particular array, it maybe desirable to place the partial length rods 60C against the wall of subchannel assembly 30. This is because the water cross of this design contains sufficient moderator immediate the partial length rod and on the opposite side of the subassembly assembly 30.

Finally, and with reference to FIG. 5B, both 4×4 and 5×5 arrays of rods are shown within the subchannel assembly 30. For the 5×5 array, partial length rods 60C are shown at four spaced apart locations, all the partial length rods being one row in from the channel sides 25 and the subchannel assembly 30. For the 4×4 array, 2 part length rods are located in the central 2×2 array of fuel rods.

It will be seen that the disclosed partial length rods enhance in an unusual number of ways the performance of fuel bundle designs. These enhancements will be discussed in terms of the respective cold operating state of the reactor, the low flow, low power state of the reactor and finally the hot and substantially full power operating characteristic of the reactor.

Cold Start Up

Referring to FIG. 6A, that portion of the fuel bundle at section 6—6 (FIG. 5A) is illustrated at the top of the reactor adjacent the partial length rod. It can be seen that because of the absence of the rod 60, the fuel-to-moderator ratio in the upper portion of the fuel assembly is increased. That is to say water, a moderator, is present in greater amounts and fuel is present in lesser amounts in the upper portion of the reactor compared to the case where the fuel rods are full length.

Figure 7:
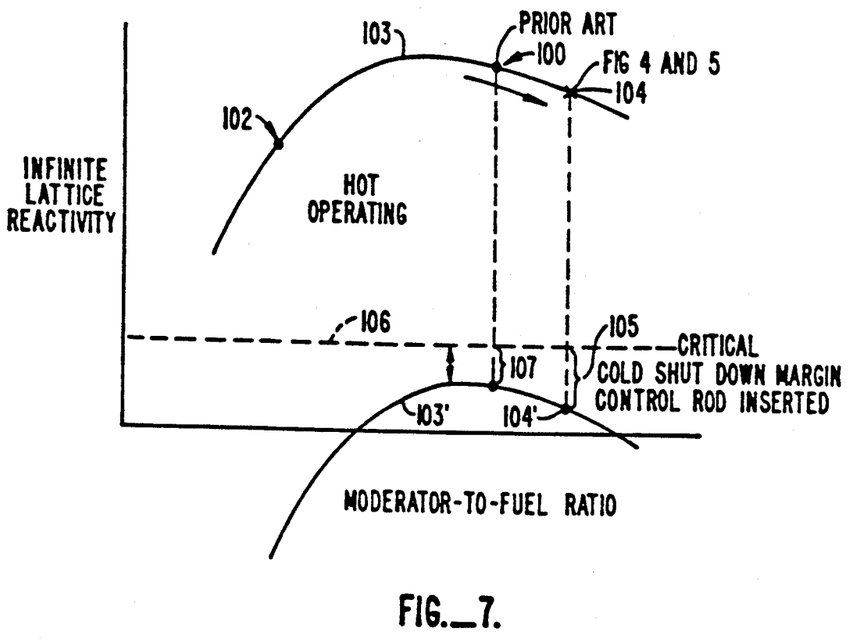
FIG. 7 is a plot of the infinite lattice reactivity against moderator to fuel ratio illustrating the improved cold shutdown margin of this invention.

Referring to FIG. 7, infinite lattice reactivity is plotted against the moderator-to-fuel ratio. This figure is representative of the reactor state at the upper portion of the fuel bundle of fuel assembly 15 (FIG. 1).

The term infinite lattice reactivity can be easily understood. Presuming there were an infinite number of fuel assemblies 15 each of which were infinitely long with a lattice geometry the same as the upper part of the fuel assembly, the plot here shown would be an accurate representation of reactivity of the upper portion of any fuel bundle.

Presuming that the reactor is critical, constructed according to the prior art and in the cold state, infinite lattice reactivity would be represented by point 100. As the reactor moved to a hot operating state at point 102, the moderator to fuel ratio would decrease. Specifically, the presence of steam voids and to some extent the expansion of the moderator water, would decrease the moderator to fuel ratio to a point 102. Plotting the points there between gives curve 103.

Turning our attention to the partial length rods, the reader will realize that the moderator to fuel ratio is increased. Thus, in the cold state the infinite lattice reactivity would be represented by 104 and would be less than for a lattice with full length rods.

Presuming insertion of the control rods, one would understand that reactivity would fall below the critical line 106. The curve 103' will be shifted to the right relative to curve 103 because the control rods displace moderator and also cause temperature and steam voids to decrease reactivity more rapidly. It can be seen, however, that point 104' falls further below the critical line. An improved cold shutdown margin 105 exists. This cold shutdown margin can readily be compared to the cold shutdown margin 107 of the prior art. The reader will understand that the cold shutdown margin constitutes a limit on the enrichment that can be provided, especially that enrichment within fuel load at the top of fuel assembly 15 (FIG. 1). By the increase of the cold shutdown margin at 105, improvements to the fuel design can be made. Specifically, burnable poisons such as gadolinium can be omitted or reduced in concentration from the top portion of the reactor fuel bundles or the fuel enrichment can be increased in the top of the fuel bundle.

There is an additional complication in the cold shutdown condition in prior art reactors. Specifically, during power operation, the conversion ratio or plutonium production is greater at the top of the prior art full length rod bundles. This primarily is caused by increased resonance neutron capture in fertile uranium 238 which produces plutonium 239. The greater steam voids in the top of the reactor reduce neutron slowing down and increase resonance neutron capture relative to the reduced steam void regions in the lower regions of the reactor. The greater steam voids also reduce fuel burnup in the top resulting in greater fissile material inventory and fewer fission products in the higher steam void regions at the top of the reactor core. The combination of reduced burnup, fewer fission products, greater fissile uranium and greater fissile plutonium gives the upper portion of the bundle a higher cold reactivity. Consequently, the top of the reactor is most reactive in the cold state and the control rods must provide sufficient control to prevent the top of the reactor from going critical.

Figure 8:
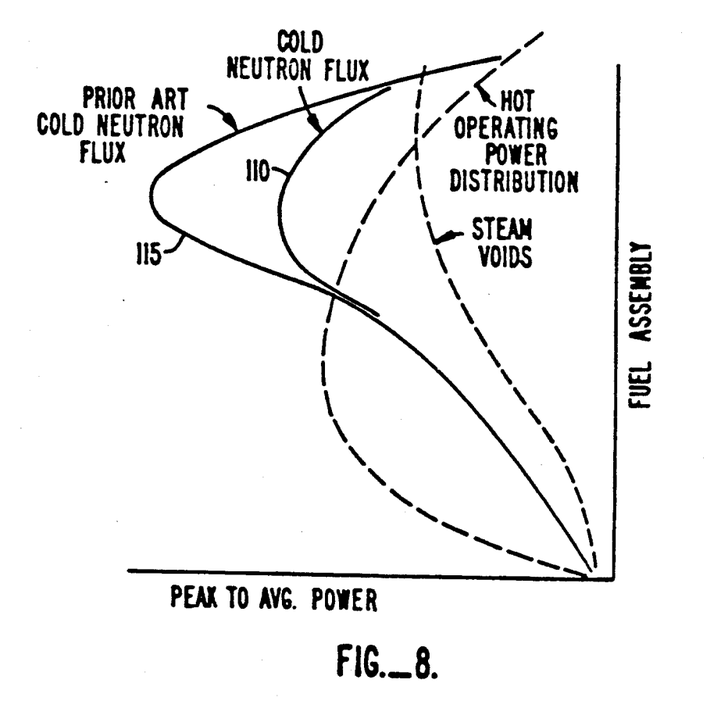
FIG. 8 is a plot of the peak to average power ratio as a function of bundle height, wherein the reduced rod density in the upper portion of the fuel bundle coupled with the improved moderator to fuel ratio are synergistically combined to improve cold shutdown ratio.

Referring briefly back to FIG. 6A, again a higher ratio of moderator is present with the partial length rods of this invention. Consequently, fast neutrons have a shorter mean slowing down length. They are moderated and fewer neutrons participate in plutonium formation through resonance capture in uranium 238. Referring to FIG. 8, the cold neutron flux 110 of the present invention provides a lesser peak than the cold neutron flux 115 of the prior art. In other words, by suppressing the formation of plutonium, the cold neutron flux peaking normally seen at the top of fuel assemblies is likewise suppressed.

The improved moderation of neutrons at the top of the fuel assembly has an additional advantage. The cruciform control rods gather slow neutrons by their capture. Neutrons are slowed down in the water moderator region above the part length fuel rods where they have greater opportunity to diffuse to the surface of the control rod where they are captured. Because these moderated neutrons are present at greater relative levels, the control rods 16 (FIG. 1) tend to capture the moderated neutrons, again providing superior control to the reactor in the cold state.

Low Flow, Low Power

Figure 9:
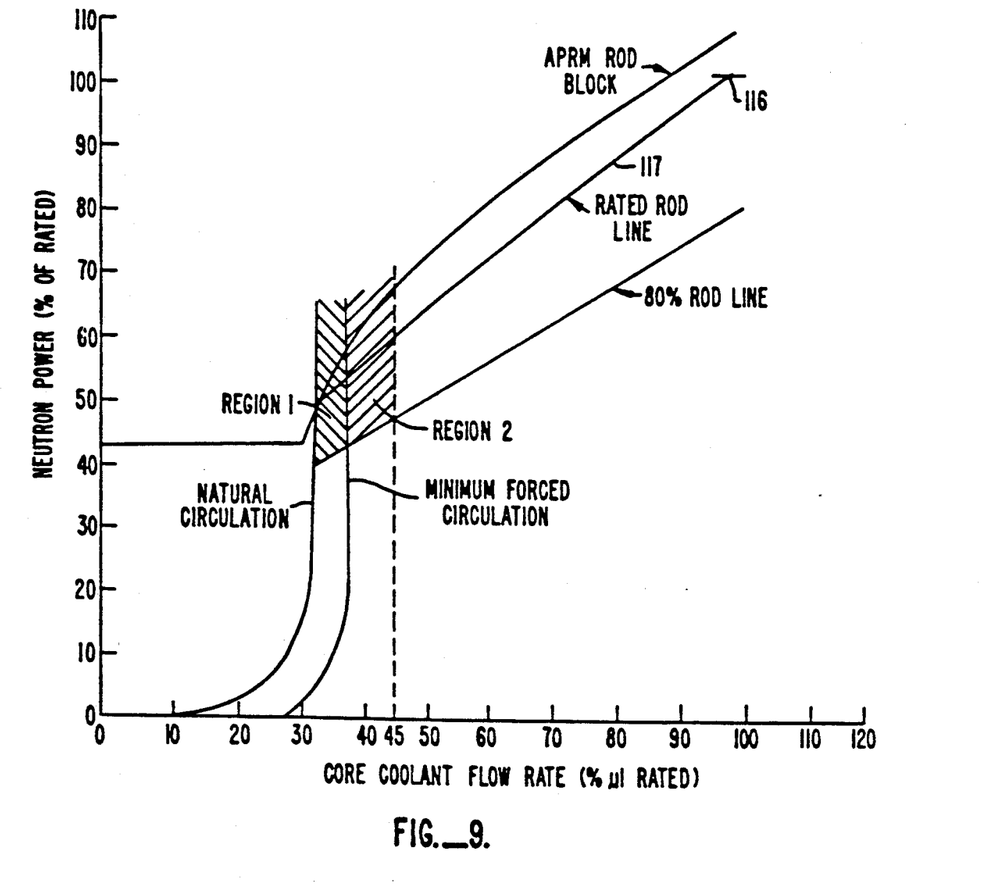
FIG. 9 is a plot of neutron power against core coolant flow rate illustrating the intersection of the lines of core flow control with minimum forced circulation and natural circulation flow rates at regions where both thermal hydraulic instabilities and coupled nuclear thermal hydraulic instabilities can occur in improperly designed fuel bundles.

Referring to FIG. 9, a simplified explanation of the BWR flow/power operating domains can be offered. Referring to FIG. 9, present rated thermal power is plotted against percent rated core coolant flow rate. Natural circulation is the circulation that is caused by the heating of the water interior to the reactor. When a reactor is initially started up, it is operated with minimum forced circulation of the coolant. As the core coolant reaches approximately 30% of rated flow rate, thermal power will be in the range of approximately 50% of rated. This condition also can be reached if there should be a loss of power to the pumps when the reactor is operating at rated power, 116. The BWR self regulates, since, if the flow is reduced, steam voids increase which cause the reactor power to decrease along the flow control line, 117. Instabilities can occur in regions 1 and 2 of the power flow map. These instabilities include thermal hydraulic instabilities and coupled nuclear thermal hydraulic instabilities.

As core coolant flow rate is increased, power likewise increases. Above approximately 45% of the rated flow rate, on the rated flow control line, 117, instabilities normally would not occur.

In the plot here shown, regions of instability in power versus flow are specifically identified. Referring to region 1, it is current regulatory practice not to allow a reactor to be operated for any significant period of time within this flow rate and power output region. It will be noted that this region is above the line of 40% power and falls roughly between 30 and 40% core coolant flow rate. Similarly, the area between 40% flow rate and 45% flow rate is an area of potential instability. Reactors operated in this region must be closely monitored according to current regulatory practice.

The instabilities that must be considered in fuel design and in reactor operation were previously described and include thermal hydraulic instability and coupled thermal nuclear hydraulic instability.

It is known that the allowable operating power at low flow as limited by stability is increased when the ratio of single phase pressure drop to two phase pressure drop is increased.

Figure 11:
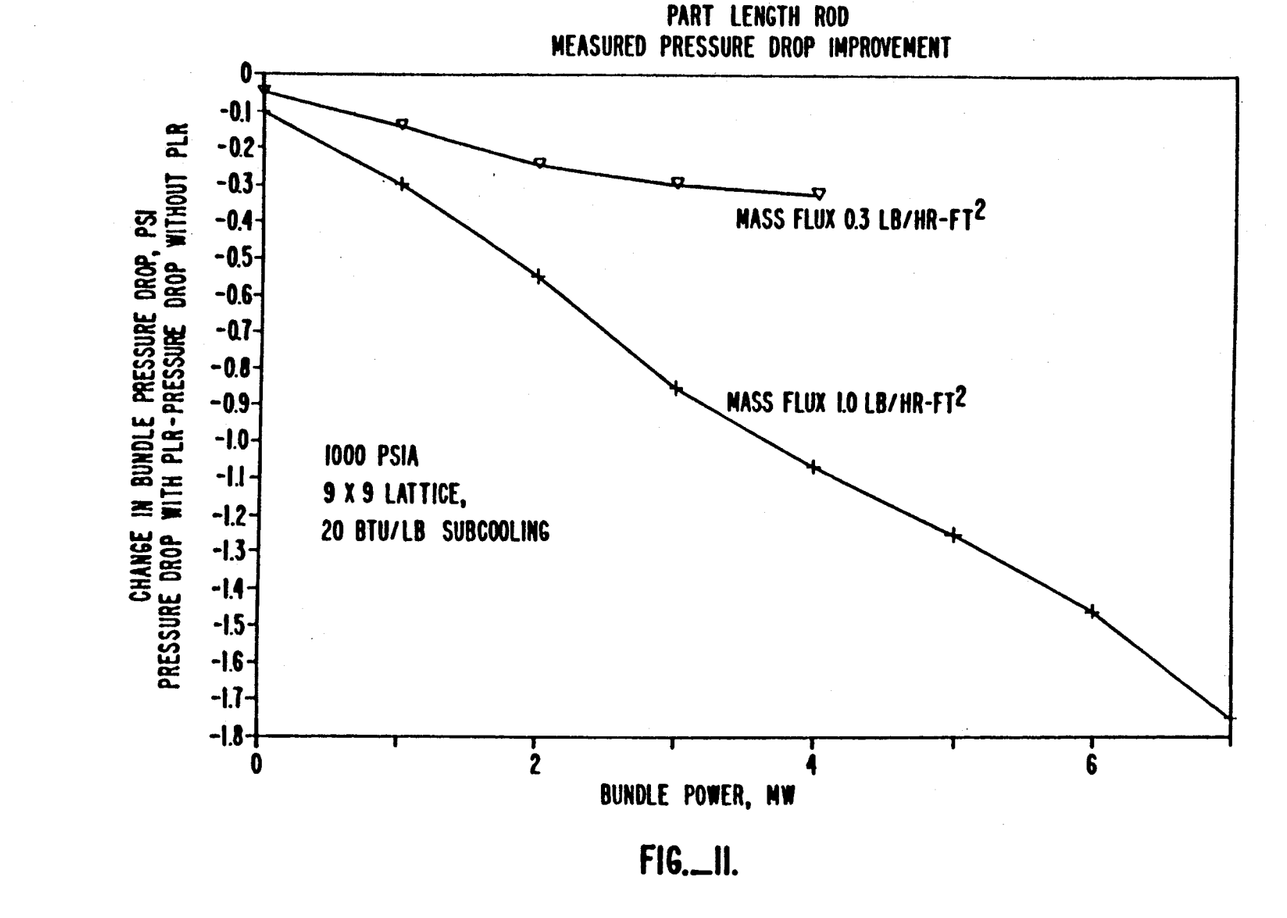
FIG. 11 is a plot of measured effects of part length rods on pressure drop as a function of bundle power.

Measurements and analysis have shown that the enclosed design reduces two phase flow pressure drop. This is illustrated in FIG. 11 which shows the measured change in pressure drop between a fuel assembly with partial length rods and a fuel assembly without part length rods as a function of bundle power and inlet mass flux of the coolant. The pressure drop reduction caused by the partial length rods increases with increases in fuel assembly power and the coolant flow rate. Although the magnitude of the improvement is less for the lower flow rates associated with natural circulation, the percentage pressure drop improvement is almost independent of flow.

The measurements shown in FIG. 11 did not include the benefits of spacers and tie plates above the partial length rods having greater flow apertures. Both spacers S2 and the tie plate 40 (FIG. 6A) can have larger apertures above the part length rods at respective apertures 67 and 69. This further reduces two phase pressure drop which results in better stability margins and greater full power flow capability.

It should also be noted from FIG. 6B that when the steam channels at higher velocities to the open region above the part length rods, 80, a greater density of water remains present surrounding the upper regions of the full length rods, 65. This water provides cooling and provides moderation for increased reactivity. Stated in other terms, although the sections of rod 60 are missing in the upper portion of the fuel bundle, the remaining rods have improved reactivity because they are surrounded by a higher moderator fraction. This higher moderator fraction comes from the steam channeling to the region above the part length rods where it flows at a greater velocity relative to the water. At steady state conditions the steam void volume fraction in the reactor core can be determined from a time average of the steam flowing in the reactor divided by the time average of total coolant or steam plus water. If the velocity of steam is increased relative to the velocity of water the steam void fraction is reduced in the reactor core.

Full Power Operation

BWR fuel assemblies are limited in the power they can generate by the thermal limits which protect the fuel from damage. Current BWR design practice is to limit the power output of a fuel bundle to a condition where boiling transition or liquid film dryout will not occur in any portion of a fuel bundle.

Returning to FIG. 8 and considering the hot operating power distribution, it can be seen that power is highest in the bottom portion of a fuel assembly and lowest at the top.

At the same time, the steam voids are low at the bottom of the fuel assembly and increase to and towards the top. In the hot operating condition, since the power generation is lowest at the top of the bundle, rods removed from the top of the bundle have a reduced effect on the overall power output. At the same time, by increased moderator to fuel ratio and reducing steam void fraction via steam channeling in the top of the reactor, the reactivity of the top of the reactor is increased. This improves the axial power shape sufficiently to approximately compensate for removal of fuel by making some of the fuel rods shorter. Consequently, again it can be seen that the partial length rods have a desirable effect on reactor performance.

The reduction in pressure drop shown in FIG. 11 makes it possible to increase the total core flow at rated power conditions. This both increases reactivity of the reactor and provides better cooling of the fuel. Consequently, it is possible to operate the reactor at greater power output or to improve the fuel cycle economics by loading less fissile material in the fresh fuel.

Figure 10:
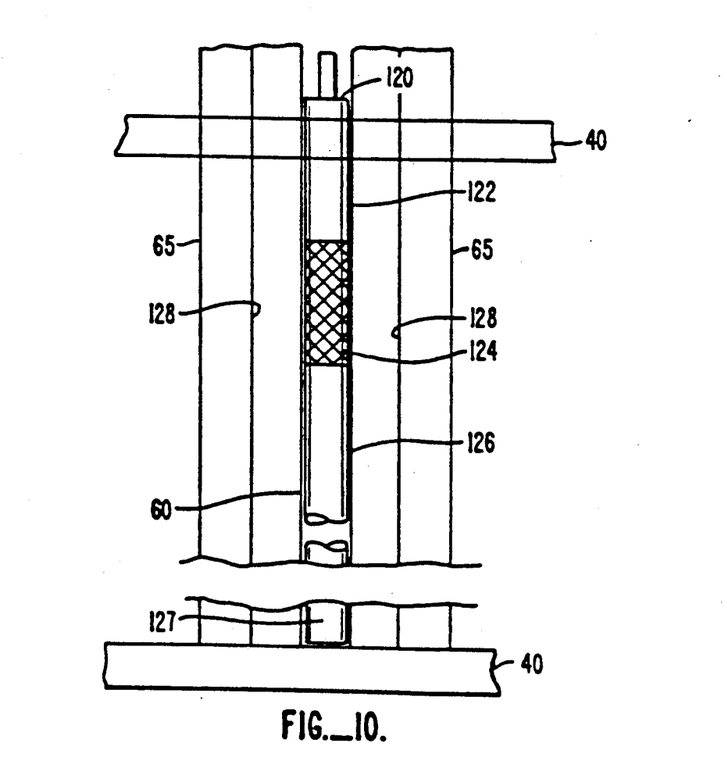
FIG. 10 is a detail illustrating the top and bottom of a partial length rod illustrating the partial removal of the gas plenum to the bottom of the partial length rod and use of uranium of reduced enrichment at the tip of the partial length rod to avoid peaking of adjacent full length rods opposite the tip of the partial length rods.

Referring to FIG. 10, the construction of a partial length rod at or near its tip is illustrated. Referring to FIG. 10, two full length rods 65 have a partial length rod 60 placed there between. Rod 60 terminates at end plug 120.

Typically, partial length rod 60 is provided with a plenum 122 and a volume of uranium of reduced enrichment 124 followed by regularly enriched uranium 126 extending substantially the remaining distance of the rod. It has been found that reduced enrichment uranium 124 reduces power peaking at the top end of the enriched region of the part length rod at 126. Such peaking occurs because of the absence of the neutron absorbing uranium and increased moderation at the top end of the partial length rod.

Fuel rods must have a fission gas plenum to accommodate fission gases that are produced by burnup of the fuel. The fission gas plenums for full length rods are located above the top of the reactor core where they have minimal effect on the efficiency of the nuclear reaction. Location of similarly designed plenums at the top of the partial length rods results in parasitic neutron capture in the steel springs and other materials that are used in the plenum. Consequently there is incentive to locate all or part of the partial length fuel rod fission gas plenum at the bottom of the partial length rod, thereby minimizing any reactivity penalty caused by neutro absorption in the plenum materials. FIG. 10 illustrates an embodiment in which there is a shortened plenum at the top of the partial length rod and second fission gas plenum at the bottom of the partial length rod.

The reader will understand that the partial length arrays illustrated are exemplary. While we prefer arrays in which partial length rods are used symmetrically within a fuel bundle, preferably in the second row from the channel wall, partial length rods could be used elsewhere within a fuel bundle. Furthermore, in some cases, the partial length rods can contain gadolinium or other burnable absorbers in addition to heavy element fissile and fertile materials.

The difference between the present disclosure and that described in Untermyer U.S. Pat. No. 2,998,367 are that:

1. In the reactor herein is designed to have a negative steam void coefficient of reactivity in the region of the reactor where boiling occurs (as distinguished from the positive steam void coefficient shown in Untermyer);

2. The fuel elements or fuel rods disclosed herein are grouped in fuel bundles which are surrounded by fuel channels and the shorter fuel rods are optimally located within each fuel bundle and channel so that the thermal-hydraulic and coupled nuclear-thermal-hydraulic performance of the reactor are improved. The fuel channels have major impact on thermal-hydraulics of the reactor. During reactor operation a liquid film flows up the inside of the channel. Consequently, part length rods have a much different effect in a BWR designed with channels than they would in a BWR, such as that of Untermyer designed without channels. Untermyer does not include fuel channels or specify the location of the partial length rods relative to the full length rods of the fuel channels. This location is critical to the reactor performance and is specified herein.

3. In the reactor herein, the fuel rods, have a unique axial shape of fuel U-235 or other fissile enrichment and burnable absorber such that power peaking problems which would occur at the tops of the partial length fuel rods of U.S. Pat. No. 2,998,367 are avoided. Untermyer does not include axial distribution of enrichment or burnable absorber.

4. In the reactor herein, the fuel rod spacers within the fuel bundle are uniquely designed to enhance the thermal-hydraulic and coupled nuclear-thermal hydraulic benefits of the partial length, shorter fuel rods. Untermyer does not include fuel rod spacers or design of fuel rod spacers to enhance the performance of the partial length rods.

5. In the reactor herein, the part length rods are terminated at or just above a fuel rod spacer. This avoids flow induced vibrations which would occur in the Untermyer patent.

6. In the reactor herein, the fission gas plenum for the partial length rods is uniquely designed so as to minimize the reactivity penalty from location of the fission gas plenum at the top of a partial length fuel rod. Untermyer does not include fission gas plenums or define unique fission gas plenum requirements for the shorter partial length rods.

7. In the reactor herein, the partial length rods are uniquely located in the reactor relative to the control rods such that said partial length rods increase the reactivity worth of the control rods when the reactor is shut down. Untermyer does not include control rods or define the location of the partial length rods relative to the control rods.

8. In the reactor herein, the part length rods are uniquely located relative to the highest power rods in the fuel assembly and relative to the fuel channel so as to enhance the critical power or margin to boiling transition performance of the fuel assembly. Untermyer does not consider boiling transition limits or location of the part length rods so as to enhance performance relative to said limits.

What is claimed is:

1. An improved fuel assembly for a boiling water reactor, comprising in combination:

a fuel channel having vertically extending walls, said channel being open at the bottom for engagement to a lower tie plate, and open at the upper end for engagement to an upper tie plate;

a lower tie plate closing the bottom of said channel, said lower tie plate further providing defined apertures for the inflow of water in said channel;

an upper tie plate at the top of said channel, said upper tie plate further providing defined apertures for the outflow of water in said channel;

said lower tie plate and said upper tie plate defining a two-dimensional matrix having a plurality of rows and columns for placement of fuel rods within said fuel channel;

a plurality of rows and columns of fuel rods positioned in said matrix, each said rod containing fissile material for producing nuclear reactions when in the presence of sufficient moderated neutron flux;

at least one water rod positioned in said fuel channel;

a plurality of said fuel rods being partial length rods extending from said lower tie plate toward said upper tie plate, and terminating before reaching said upper tie plate, the remainder of said fuel rods being full length fuel rods extending between said lower tie plate and said upper tie plate, said full length fuel rods, partial length fuel rods, and water rods being positioned in said matrix such that each of said full length rods is adjacent to a matrix position, said adjacency including spacing selected along a row, a column or diagonal which is occupied by a component selected from the group consisting of partial length rods and water rods.

2. The invention of claim 1 and wherein said upper tie plate defines an expanded flow area and volume above the end of at least one partial length rod for the flow of water and steam.

* * * * *